(12) United States Patent
Fukuda et al.

(10) Patent No.: US 7,443,461 B2
(45) Date of Patent: Oct. 28, 2008

(54) LIQUID CRYSTAL DISPLAY DEVICE HAVING A PRISM SHEET BETWEEN FIRST AND SECOND LIGHT DIFFUSION LAYERS

(75) Inventors: Kouichi Fukuda, Mobara (JP); Tetsuya Nagata, Mobara (JP)

(73) Assignee: Hitachi Displays, Ltd., Chiba (JP)

( * ) Notice: Subject to any disclaimer, the term of this patent is extended or adjusted under 35 U.S.C. 154(b) by 0 days.

(21) Appl. No.: 10/662,405

(22) Filed: Sep. 16, 2003

(65) Prior Publication Data
US 2004/0100597 A1 May 27, 2004

(30) Foreign Application Priority Data
Oct. 28, 2002 (JP) ............................. 2002-312032

(51) Int. Cl.
*G02F 1/1335* (2006.01)
(52) U.S. Cl. ........................................ 349/64; 349/114
(58) Field of Classification Search .................. 349/64, 349/67, 96–98, 113, 114
See application file for complete search history.

(56) References Cited

U.S. PATENT DOCUMENTS

| | | | | |
|---|---|---|---|---|
| 5,847,795 A | * | 12/1998 | Satoh et al. ................. | 349/137 |
| 6,124,905 A | * | 9/2000 | Iijima ........................... | 349/62 |
| 6,317,180 B1 | * | 11/2001 | Kuroiwa et al. .............. | 349/96 |
| 6,359,668 B1 | * | 3/2002 | Iijima et al. .................. | 349/61 |
| 6,590,625 B1 | | 7/2003 | Umemoto et al. | |
| 6,602,596 B2 | * | 8/2003 | Kimura et al. ............... | 428/327 |
| 6,804,058 B1 | * | 10/2004 | Ouderkirk et al. ............ | 359/494 |
| 6,827,460 B2 | * | 12/2004 | Higuchi ........................ | 362/609 |
| 6,906,767 B1 | * | 6/2005 | Iijima .......................... | 349/113 |
| 2002/0033915 A1 | * | 3/2002 | Masaki et al. ................ | 349/112 |

FOREIGN PATENT DOCUMENTS

| | | |
|---|---|---|
| JP | 2000-330107 | 5/1999 |
| JP | 2001-91943 | 9/1999 |
| JP | 2002-98960 | 9/2000 |
| JP | 2002-98963 | 9/2000 |
| JP | 2002-303728 | 4/2001 |

* cited by examiner

*Primary Examiner*—Michael H Caley
(74) *Attorney, Agent, or Firm*—Reed Smith LLP; Stanley P. Fisher, Esq.; Juan Carlos A. Marquez, Esq.

(57) ABSTRACT

In a liquid crystal display device capable of performing as both a transmissive display and a reflective display using a transmissive type liquid crystal display panel, the influence attributed to a shade as viewed from the oblique direction can be reduced so that favorable visibility can be ensured. In a liquid crystal display device including a transmissive type liquid crystal display panel which sandwiches a liquid crystal layer between a pair of substrates and a backlight which is arranged at a back face of the liquid crystal display panel and has a light source and a reflector, wherein the device is capable of performing as a transmissive display using light from the light source and as a reflective display using external light incident from a front face side of the liquid crystal display panel by reflecting the external light on the reflector, at least two or more light diffusion layers are arranged between the back-face-side substrate out of the pair of substrates and the reflector of the backlight.

13 Claims, 6 Drawing Sheets

LIQUID CRYSTAL DISPLAY DEVICE HAVING A PRISM SHEET BETWEEN FIRST AND SECOND LIGHT DIFFUSION LAYERS

BACKGROUND OF THE INVENTION

The present invention relates to a liquid crystal display device, and more particularly to a liquid crystal display device which is capable of performing both of a transmissive display and a reflective display using a transmissive-type liquid crystal display panel.

For example, with respect to a liquid crystal display device which is served for a mobile telephone or the like, there has been known a liquid crystal display device which can perform both of a transmissive display and a reflective display such that the transmissive display is performed using light from a backlight under a dark environment and the reflective display is performed using an external light under a bright atmosphere.

The liquid crystal display device which is capable of performing both of the transmissive display and the reflective display is roughly classified into two types of systems.

The first type of system is a system which combines a liquid crystal display panel of a semi-transmissive type (also referred to as a partial transmissive type) which incorporates a semi-transparent reflective film such as a half mirror or a reflection film having an opening for allowing light from a backlight to pass therethrough in the inside of the liquid crystal display panel and the backlight.

The second type of system is a system in which a liquid crystal display panel per se uses a transmissive type liquid crystal display panel and enables a transmissive display using light from a light source such as a backlight and a reflective display which uses an external light incident from a front face side of the liquid crystal display panel in such a manner that the external light is reflected on a reflector of the backlight (see following patent literatures 1, 2 and 3).

FIG. 9 is a cross-sectional view for explaining an example of a conventional second-type liquid crystal display device. This drawing depicts a content described in the patent literature 1 in a simplified form.

As shown in FIG. 9, a backlight is arranged at a back face of a transmissive type liquid crystal display panel (liquid crystal display element).

The liquid crystal display panel is constituted such that a liquid crystal layer 3 is sandwiched between a pair of substrates (first substrate 1 and second substrate 2) which are laminated to each other using a sealing material 4, a polarizer 5 is laminated to a back face of the first substrate 1 which is positioned at a back face side, and a polarizer 6 is laminated to a front face of the second substrate 2 which is positioned at a front face side. Here, electrodes, orientation films, color filters and the like are omitted from the drawing.

The backlight is constituted of a light source 9, a light guide body 7 on which light from the light source 9 is incident and a reflector 8 which is arranged on the back face of the light guide body 7. Here, although the light guide body 7 includes a prism portion, the prism portion is omitted from the drawing. Further, although the backlight may be provided with a prism sheet, the prism sheet is omitted from the drawing.

Here, the liquid crystal display panel is of a transmissive type liquid crystal display panel and performs a transmissive display using light 20 from the light source 9. Further, the liquid crystal display panel is capable of performing a reflective display using a reflection light 22 obtained by reflecting an external light 21 from the front face side of the liquid crystal display panel on the reflector 8 of the backlight.

Further, in this liquid crystal display device, for the purpose of obtaining a display with no luminance irregularities, a light diffusion plate 10 is arranged between the liquid crystal display panel and the backlight whereby light 20 from the light source 9, the external light 21 and the reflection light 22 are diffused.

Further, in the patent literature 2, there is disclosed a liquid crystal display panel in which in place of the light diffusion plate 10, a resin film in which scattering fillers are dispersed is laminated to a lower face of the polarizer 5 at the back face side. With respect to the position of the resin film, there is a description that the resin film is arranged at an arbitrary position so long as the resin film is disposed between the reflector 8 of the backlight and the front-face-side polarizer 6. Further, there is also a description that using a diffusion layer formed of a tacky adhesive material in which scattering fillers are dispersed, members which are arranged in front of and behind the diffusion layer (for example, a reflection polarizer and a λ/4 phase plate or a twisted phase plate) may be laminated to each other. This diffusion layer is also provided for obtaining a display having no luminance irregularities.

Further, in the patent literature 3, there is disclosed a liquid crystal display panel in which, in place of the light diffusion plate 10 of the patent literature 1, a filler mixed type diffusion plate or a diffusion plate formed of a micro lens sheet is arranged between the front-face-side second substrate 2 and the polarizer 6. Further, by imparting the backscattering property to the diffusion plate, a portion of the external light 21 incident from the front face side is made to directly return to the front face side due to reflection without making the portion to pass through the liquid crystal layer 3 whereby the luminance of a screen is enhanced.

Here, the patent literature 3 discloses, as a modification of the invention described therein, an example in which a diffusion plate is arranged between the back-face-side first substrate 1 and the polarizer 5 or an example in which diffusion plates are arranged between the front-face-side second substrate 2 and the polarizer 6 as well as between the back-face-side first substrate 1 and the polarizer 5. However, in the patent literature 3, there is a description that when the diffusion plate is arranged at the back face side, light for enhancing the luminance of screen passes through the liquid crystal layer 3 and hence, a quantity of light which is irradiated to the front face side is changed in response to an image to be displayed whereby it is preferable to arrange the diffusion plate at the front face side.

Patent literature 1: Japanese Unexamined Patent Publication 2002-98960 (paragraphs 0033 to 0043, FIG. 1 to FIG. 5)

Patent literature 2: Japanese Unexamined Patent Publication 2002-98963 (paragraphs 0044, 0060, 0130 to 0132, FIG. 1, FIG. 3 and FIG. 5)

Patent literature 3: Japanese Unexamined Patent Publication 2001-91943 (paragraphs 0037, 0073 to 0076, 0087 to 0089, FIG. 1 to FIG. 5)

SUMMARY OF THE INVENTION

However, inventors of the present application have found out that the conventional liquid crystal display devices have following drawbacks.

FIG. 10 is a perspective view for explaining the drawback when a screen of the conventional second-system liquid crystal display device is viewed from an oblique direction.

In the conventional first system, in performing the transmissive display which uses the light source of the backlight, the use efficiency of light is lowered and hence, it is advantageous to adopt the second system when the transmissivity is emphasized.

However, in case the second system is adopted, at the time of performing the reflective display using an external light, when black is displayed at a portion of the display region 30 and a viewer observes the screen from the oblique direction, it has been found that a thin shade 32 appears behind or in the depths of an original black display region 31.

This phenomenon is considered to occur due to a following reason.

FIG. 11 is a cross-sectional view for explaining the reason why the shade shown in FIG. 10 is generated.

Here considered is a case in which an eye 40 of a viewer observes the screen from the oblique direction in the conventional structure explained in conjunction with FIG. 9. An external light 23 which is incident from a front face advances via a region of the liquid crystal layer 3 which performs a white display and hence, the external light 23 directly passes through the liquid crystal display panel, is diffused by the light diffusion plate 10 and, thereafter, is reflected on a reflector 8 thus being turned into a reflection light 25. The reflection light 25 is diffused by the light diffusion plate 10 and, thereafter, is turned into a linearly polarized light by the polarizer 5 at the back-face side of the liquid crystal display panel. The linearly polarized light passes through a region 34 of the liquid crystal layer 3 which performs a black display and, thereafter, is absorbed in the front-face-side polarizer 6. Accordingly, as indicated by a dotted line in the drawing, the reflection light 25 does not reach the eye 40 of the viewer and hence, the original black display region 31 is displayed.

On the other hand, an external light 24 which is incident from the front face side passes through a region 34 of the liquid crystal layer 3 which performs a black display and hence, the external light 24 is absorbed by the polarizer 5 at the back face side and a black display region 33 is also formed at the back side of the liquid crystal display panel. Here, the external light 24 does not reach the reflector 8 as indicated by a dotted line in the drawing and hence, a reflection light 26 does not return to the eye 40 of the viewer. Here, to consider the observation from the eye 40 of the viewer, the black display region 33 in the back side is reflected on the reflector 8 and hence, the external light 24 appears as the shade 32. Although the shade 32 has an end portion thereof more or less blurred by the light diffusion plate 10, the shade 32 has not yet reached a state in which the shade 32 is completely erased.

Further, although not shown in the drawing, it is also considered that the shade 32 is reflected on the light diffusion plate 10 as well as the reflector 8.

Here, the conventional first system uses the semi-transmissive reflective type liquid crystal display panel and hence, it is considered that the shade is formed more or less based on the same principle. However, the reflection display by the built-in reflection film which is performed before the external light reaches the polarizer at the back side is dominant and hence, the shade is hardly apparent.

Although the above-mentioned explanation is made by taking the structure disclosed in the patent literature 1 into consideration, even when the diffusion layer disclosed in the patent literature 2 is used, the complete erasing of the shade 32 cannot be realized.

Further, although the patent literature 3 uses the diffusion layer which generates the backscattering to enhance the luminance of the screen, while the enhancement of the luminance is obtained, there arises a drawback that the contrast is lowered. Further, there also exists a drawback that when the diffusion layer is arranged at the front side and the high definition is advanced, the image is blurred.

In this manner, conventionally, none of the patent literatures 1 to 3 recognize the drawbacks with respect to the shade 32 and hence, the drawbacks have not been studied.

The present invention has been made in view of such circumstances and it is an advantageous effect of the present invention that a liquid crystal display device which ensures the favorable visibility can be obtained.

Other tasks and advantages of the present invention will become apparent in view of the description of the whole specification.

Accordingly, in the present invention, at least two or more light diffusion layers are provided between the first substrate 1 at a back face side of the liquid crystal display panel to the reflector 8 of the backlight.

To enumerate one example of typical constitutions of the present invention, they are as follows.

(1) In a liquid crystal display device which includes a transmissive type liquid crystal display panel which sandwiches a liquid crystal layer between a pair of substrates and a backlight which is arranged at a back face of the liquid crystal display panel and has a light source and a reflector and is capable of performing a transmissive display which uses light from the light source and a reflective display which uses an external light incident from a front face side of the liquid crystal display panel by reflecting the external light on the reflector, the improvement is characterized in that at least two or more light diffusion layers are arranged between the back-face-side substrate out of the pair of substrates and the reflector of the backlight.

(2) In the above-mentioned constitution (1), at least one of the light diffusion layers is constituted of a diffusion plate or a diffusion sheet.

(3) In the above-mentioned constitution (1) or (2), at least one of the light diffusion layers is constituted of a diffusion tacky adhesive material.

(4) In any one of the above-mentioned constitutions (1) to (3), at least one of the light diffusion layers is constituted of a diffusion film.

(5) In a liquid crystal display device which includes a transmissive type liquid crystal display panel which sandwiches a liquid crystal layer between a pair of substrates, a light source, a light guide body which is arranged at a back face side of the liquid crystal display panel and on which light from the light source is incident, and a reflector which is arranged at a back face of the light guide body, and is capable of performing a transmissive display which uses light from the light source and a reflective display which uses an external light incident from a front face side of the liquid crystal display panel by reflecting the external light on the reflector, the improvement is characterized in that at least two or more light diffusion layers are arranged between the back-face-side substrate out of the pair of substrates and the light guide body.

(6) In the constitution (5), the liquid crystal display device includes a polarizer which is arranged between the back-face-side substrate out of the pair of substrates and the light guide body and the light diffusion layer which is arranged between the back-face-side substrate and the polarizer.

(7) In the constitution (5), the liquid crystal display device includes
a polarizer which is arranged between the back-face-side substrate out of the pair of substrates and the light guide body and
a diffusion tacky adhesive material which is arranged between the back-face-side substrate and the polarizer and acts as the light diffusion layer.

(8) In the constitution (5), the liquid crystal display device includes
a polarizer which is arranged between the back-face-side substrate out of the pair of substrates and the light guide body and
the light diffusion layer which is arranged on a surface of the polarizer at a side where the light guide body is positioned.

(9) In the constitution (5), the liquid crystal display device includes a polarizer provided with an antiglare layer which is arranged between the back-face-side substrate out of the pair of substrates and the light guide body and acts as the light diffusion layer.

(10) In the constitution (5), the liquid crystal display device includes
a polarizer which is arranged between the back-face-side substrate out of the pair of substrates and the light guide body,
a reflection polarizer which is arranged between the polarizer and the light guide body, and
the light diffusion layer which is arranged between the polarizer and the reflection polarizer.

(11) In the constitution (5), the liquid crystal display device includes
a polarizer which is arranged between the back-face-side substrate out of the pair of substrates and the light guide body,
a reflection polarizer which is arranged between the polarizer and the light guide body, and
a diffusion tacky adhesive material which is arranged between the polarizer and the reflection polarizer and acts as the light diffusion layer.

(12) In the constitution (5), the liquid crystal display device includes
a polarizer which is arranged between the back-face-side substrate out of the pair of substrates and the light guide body,
a reflection polarizer which is arranged between the polarizer and the light guide body,
the light diffusion layer which is arranged between the back-face-side substrate and the polarizer, and
the light diffusion layer which is arranged between the polarizer and the reflection polarizer.

(13) In any one of the constitutions (5) to (12), the liquid crystal display device includes a diffusion plate or a diffusion sheet which acts as one of the light diffusion layers and the diffusion plate or the diffusion sheet is arranged at a position closest to the light guide body among at least two or more light diffusion layers.

The present invention is not limited to the above-enumerated constitutions and various modifications can be conceivable without departing from the technical concept of the present invention.

DESCRIPTION OF THE PREFERRED EMBODIMENTS

Embodiments of the present invention are explained in detail hereinafter in conjunction with drawings.

First Embodiment

Figure 1:
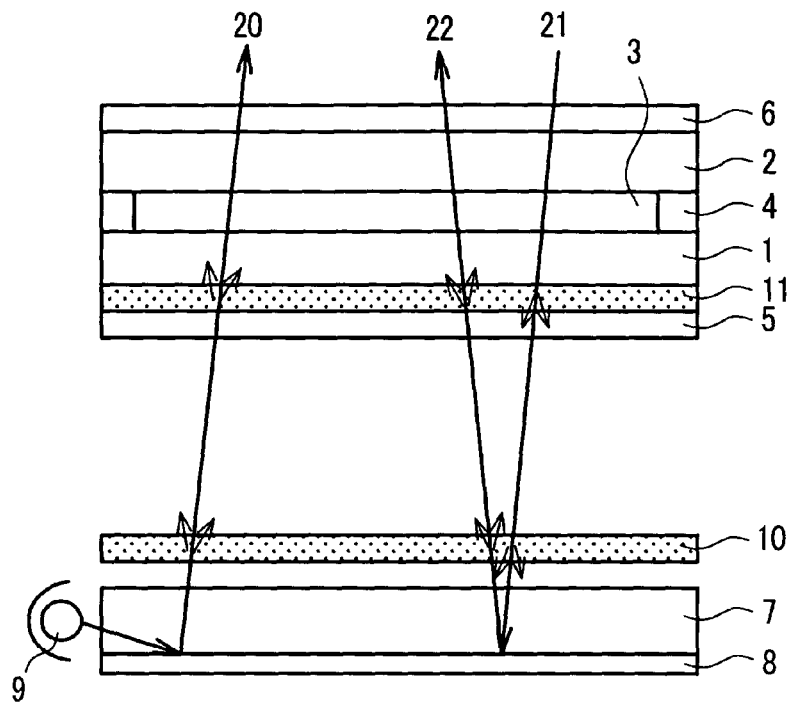
FIG. 1 is a cross-sectional view for explaining the first embodiment of the present invention.

FIG. 1 is a cross-sectional view for explaining the first embodiment of the present invention.

In a liquid crystal display panel according to this embodiment, a liquid crystal layer 3 is sandwiched between a pair of substrates (first substrate 1 and second substrate 2) which are laminated to each other by a sealing material 4, a polarizer 5 is formed on a back face of the first substrate 1 which is positioned at a back face side of the liquid crystal display panel, and a polarizer 6 is formed on a front face of the second substrate 2 which is positioned at a front face side of the liquid crystal display panel.

The liquid crystal display panel may adopt any one of, for example, an STN method, a TN method, a vertical electric field method, a lateral electric field method and the like. Here, on an inner surface of at least one of the first substrate 1 and the second substrate 2, electrodes not shown in the drawing which are served for driving the liquid crystal layer 3 are formed. Further, although various parts including orientation films which determine the initial orientation directions of the liquid crystal layer 3, color filters for performing a color display and the like are provided depending on necessity, they are omitted from the drawing. Further, phase difference plates, a touch panel and the like may be arranged on the outsides of a pair of substrates.

On a back face (opposite to a viewer) of the liquid crystal display panel, a backlight is arranged. In this embodiment, as an example, the backlight is constituted of a light source 9, a light guide body 7 on which light from the light source 9 is incident and a reflector 8 which is arranged on a back face of the light guide body 7. Here, a shape of the light guide body 7 is not specifically limited and grooves or the like which perform a function of a prism may be formed in the light guide body 7, for example. A metal plate or a resin-made sheet having a metallic color or a white color, for example, can be used as the reflector 8. Further, in this specification, a part which forms a metal film on the back side of the light guide body 7 by vapor deposition may be also included in the concept of the reflector 8. As the light source 9, for example, light emitting diodes (LED) or a cold cathode fluorescent tube can be used.

Here, as functions which the backlight according to the present invention must satisfy, at least two functions, that is, a function as a light source which is used at the time of performing a transmissive display and a function for reflection which is used at the time of performing a reflective display are necessary. Accordingly, the backlight includes the light source 9 and the reflector 8. Provided that the backlight has these two functions, any type of backlight can be used. For example, the backlight may be constituted of a combination of a light source such as an EL (electroluminescence) and the reflection function.

Due to such a constitution, it is possible to perform not only the transmissive display using light 20 from the light source 9 but also the reflective display using a reflection light 22 by reflecting an external light 21 from a front face side of the liquid crystal display panel on the reflector 8 of the backlight. Here, to enhance the use efficiency of light, it is desirable to enhance the optical transmissivity of the liquid crystal display panel. For example, it is desirable to provide ideas to ensure the sufficient visibility also in the reflective display by increasing a numerical aperture or by decreasing a thickness of color filters and the like.

Further, according to this embodiment, while a light diffusion layer 10 is arranged between the light guide body 7 of the backlight and the polarizer 5 at a back face side of the liquid crystal display panel, a light diffusion layer 11 is also arranged between the polarizer 5 at the back face side and the first substrate 1 at the back face side. That is, two light diffusing layers 10, 11 are arranged between the back-face-side first substrate 1 and the reflector 8.

As the light diffusion layer 10, for example, a light diffusion plate, a light diffusion sheet or the like can be used. Further, as the light diffusion layer 11, for example, a diffusion tacky adhesive material can be used. In this case, the light diffusion layer 11 can also have a function of laminating the polarizer 5 to the first substrate 1 and hence, the number of parts can be reduced. Here, as the light diffusion layer 11, it is possible to use other member such as a light diffusion plate, a light diffusion sheet or a light diffusion film, for example, without using the diffusion tacky adhesive material.

Figure 10:
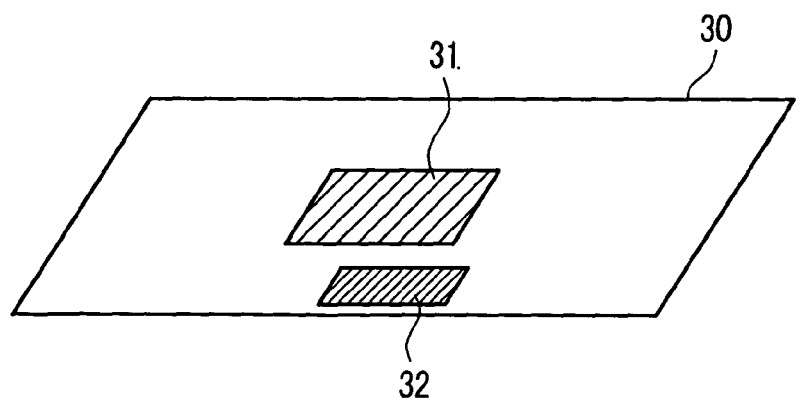
FIG. 10 is a perspective view for explaining drawbacks when a screen of the conventional second type liquid crystal display device is observed in the oblique direction.

With the provision of these light diffusion layers 10, 11, it is possible not only to obtain the display having no luminance irregularities but also to reduce the influence of a shade 32 as viewed from the oblique direction as explained in conjunction with FIG. 10.

Figure 2:
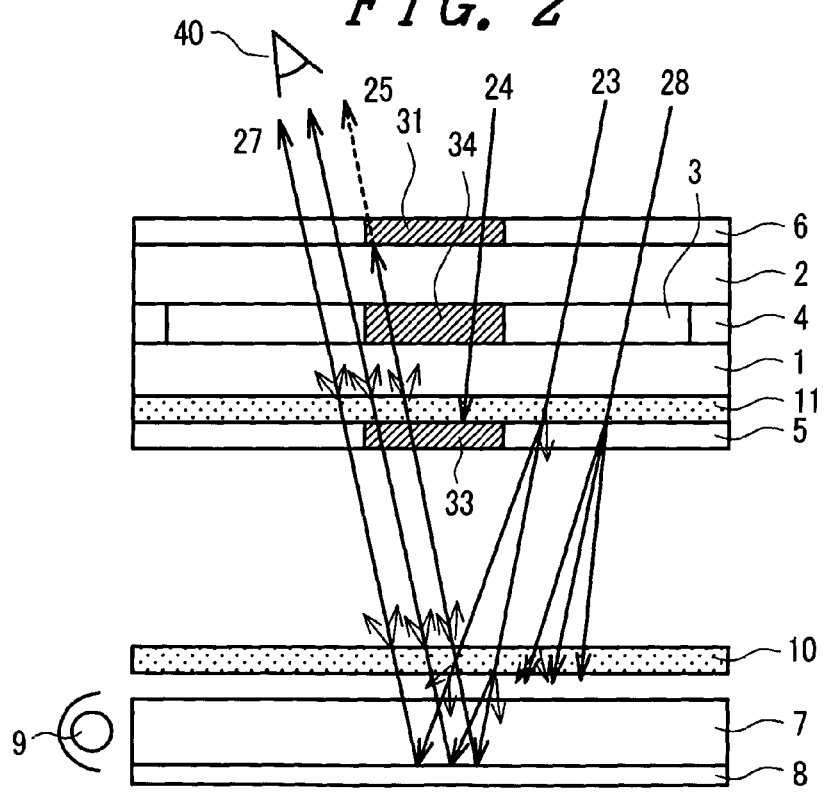
FIG. 2 is a cross-sectional view for explaining a reason that a shade can be reduced by the embodiment shown in FIG. 1.

FIG. 2 is a cross-sectional view for explaining a reason why the shade can be reduced according to the embodiment shown in FIG. 1.

Figure 11:
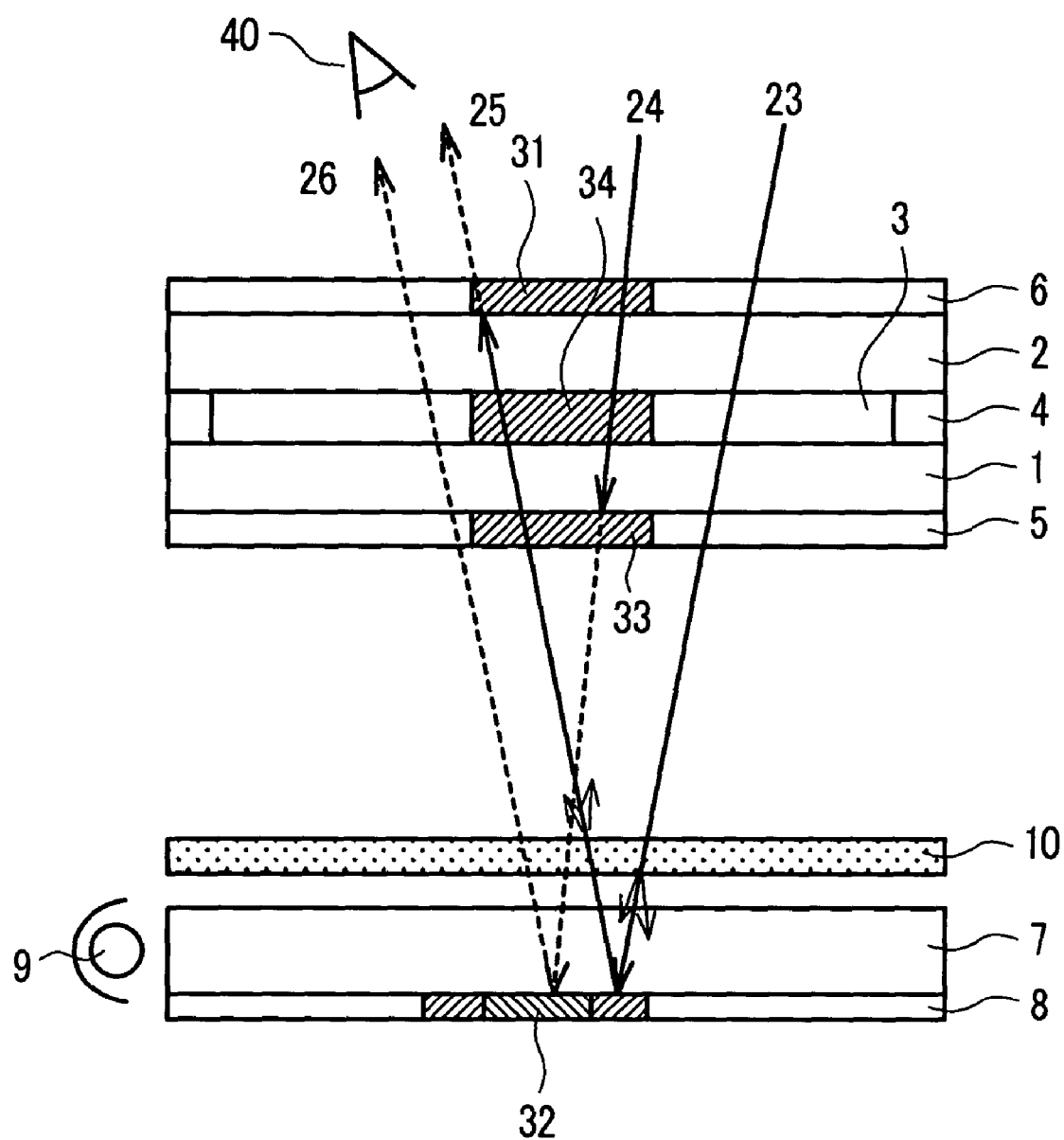
FIG. 11 is a cross-sectional view for explaining a reason that a shade shown in FIG. 10 is generated.

Also in this embodiment, considered is a case in which an eye 40 of a viewer observes the screen in the oblique direction as has been explained in conjunction with FIG. 10 and FIG. 11. The external light 23 which is incident from the front face advances via the region of the liquid crystal layer 3 which performs a white display and hence, the external light 23 directly passes through the liquid crystal display panel. Thereafter, the external light 23 is reflected on the reflector 8 and is turned into the reflection light 25. The reflection light 25 is turned into a linearly polarized light due to the polarizer 5 at the back face side. The linearly polarized light passes through a region 34 of the liquid crystal layer 3 where the black display is performed and, thereafter, is absorbed by the polarizer 6 at the front face side. Accordingly, as indicated by a dotted line in the drawing, the reflection light 25 does not reach the eye 40 of the viewer and hence, the original black display region 31 is displayed.

On the other hand, the external light 24 which is incident from the front face side passes through the region 34 of the liquid crystal layer 3 which performs the black display and hence, the external light 24 is absorbed by the back-face-side polarizer 5 whereby the black display region 33 is formed also on the back side of the liquid crystal display panel.

However, according to this embodiment, different from the case explained in conjunction with FIG. 11, the light diffusion layers 10, 11 are arranged at two positions. Accordingly, after the external light 23 is scattered by the light diffusion layer 11, both of the light which advances straightly without being scattered and the scattered external light are further scattered by the light diffusion layer 10 and hence, when the scattered light reaches the reflector 8, the scattered light reaches, in a sufficiently diffused manner, locations where the scattered light cannot reach when only either one of the light diffusion layer 10 or the light diffusion layer 11 is provided. Then the scattered light is reflected and is turned into the reflection light 27. Then, the reflection light 27 is again scattered by the light diffusion layers 10, 11 arranged at two positions so that the light which has not reached conventionally reaches the eye 40 of the viewer.

Further, an external light 28 which is incident from a separate locations is also sufficiently diffused by two light diffusion layers 10, 11 and hence, the external light 28 is sufficiently diffused to a range which the external light 28 cannot reach with only either one of the light diffusion layer 10 or the light diffusion layer 11 whereby the external light 28 reaches the eye 40 of the viewer as the reflection light.

By sufficiently diffusing the external light 28 using two light diffusion layers 10, 11 in this manner, it is possible to make the shade 32 hardly apparent.

Further, even when the shade is reflected on the light diffusion layer 10 instead of the reflector 8, since the sufficient diffusion is ensured, the visibility is not adversely affected.

To ensure the sufficient diffusion of light, it is effective to make the light diffusion layers 10, 11 and the reflector 8 sufficiently spaced apart from each other. Accordingly, in this embodiment, by arranging the light diffusion layer 11 between the first substrate 1 and the polarizer 5, the distance between the light diffusion layer 11 and the light diffusion layer 10 is increased. Further, also due to the presence of the light guide body 7 between the light diffusion layer 10 and the reflector 8, the distance between both of them can be increased.

Further, in this embodiment, it is desirable to provide at least two or more light diffusion layers 10, 11 at the back face side of the liquid crystal display panel, while it is not desirable to provide them at the front face side of the liquid crystal display panel. The reason is that when the light diffusion layers are provided at the front face side of the liquid crystal display panel, along with the progress of the high definition, images are blurred and hence, the visibility is lowered. In one example of high definition, for example, the size of one sub pixel is not more than 200 μm in the longitudinal direction and not more than 200/3 μm in the lateral direction. However, provided that the viewer does not care the blur of images, the light diffusion layers may be provided at the front face side of the liquid crystal display panel.

Further, since this embodiment has the advantageous effect that the shade when viewed in the oblique direction becomes less apparent, this advantageous effect is large in the liquid crystal display device adopting a lateral electric field type, for example, having a wide viewing angle (for example, the viewing angle being not less than 150 degrees).

Second Embodiment

Figure 3:
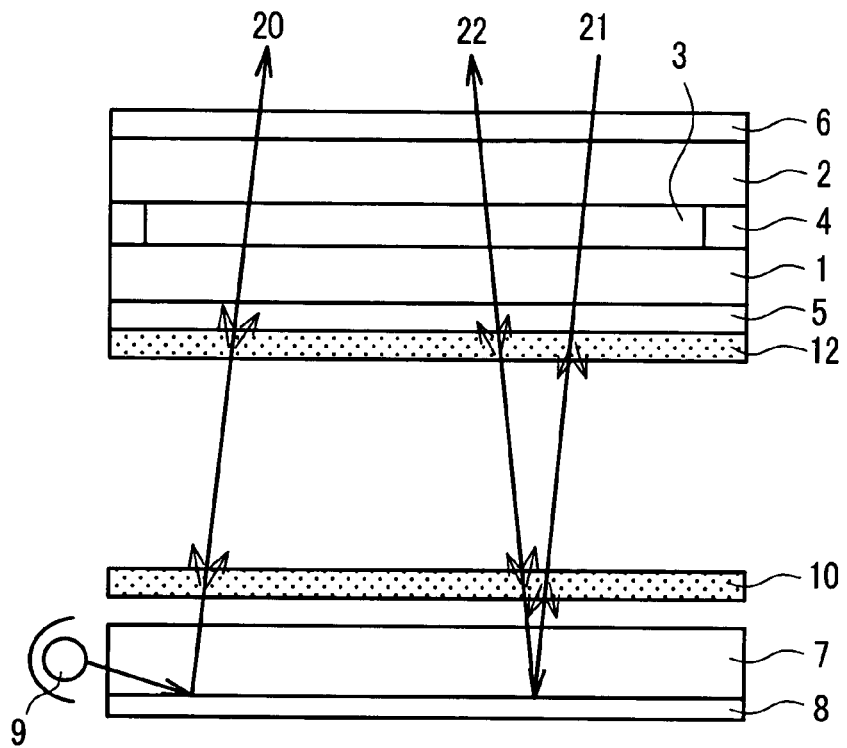
FIG. 3 is a cross-sectional view for explaining the second embodiment of the present invention.

FIG. 3 is a cross-sectional view for explaining the second embodiment of the present invention.

In this embodiment, the explanation of the points which overlap the corresponding points of the first embodiment described above is omitted. In this embodiment, the constitution which makes this embodiment different from the first embodiment shown in FIG. 1 lies in that in place of arranging the light diffusion layer 11 between the first substrate 1 and the polarizer 5, a light diffusion layer 12 is arranged on a surface of the back face side (side at which the light guide body 7 is positioned) of the polarizer 5.

By using a polarizer having an antiglare layer which functions as a light diffusion layer, for example, as the light diffusion layer 12, the number of parts can be reduced. The light diffusion layer 12 is not limited to the polarizer having an antiglare layer and may be formed of a diffusion tacky adhesive material, a diffusion plate, a diffusion sheet, a diffusion film or the like.

Third Embodiment

Figure 4:
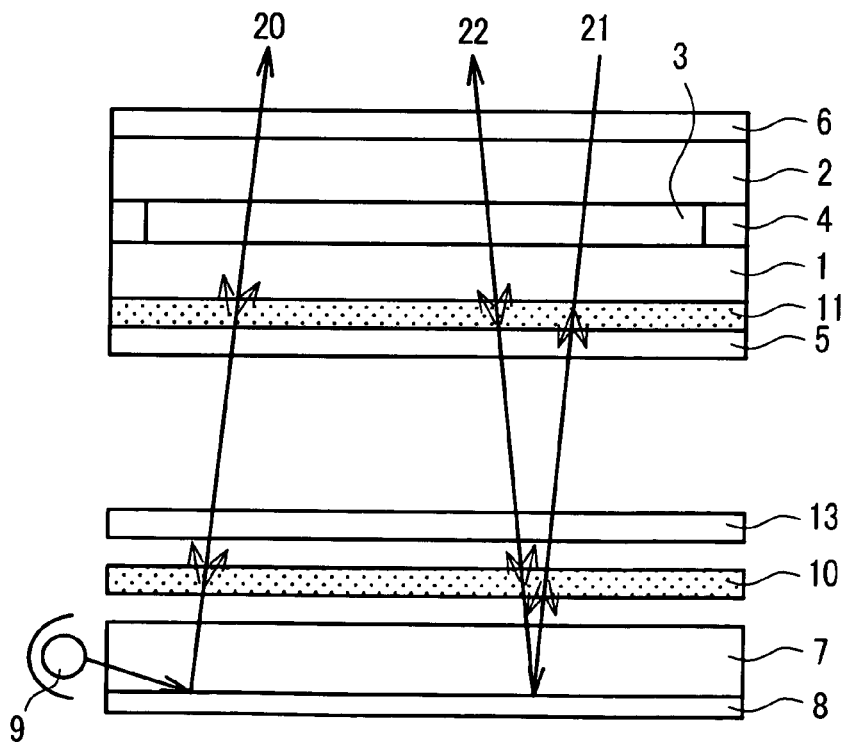
FIG. 4 is a cross-sectional view for explaining the third embodiment of the present invention.

FIG. 4 is a cross-sectional view for explaining the third embodiment of the present invention.

In this embodiment, the explanation of the points which overlap the corresponding points of other embodiments described above is omitted. In this embodiment, the constitution which makes this embodiment different from the first embodiment shown in FIG. 1 lies in that a prism sheet 13 is added.

Although the position of the prism sheet 13 is arranged between the polarizer 5 and the light diffusion layer 10 in FIG. 4, the position of the prism sheet 13 is not limited to such an arrangement. That is, the prism sheet 13 may be arranged between the light diffusion layer 10 and the light guide body 7 or between the light guide body 7 and the reflector 8. The number of the prism sheets 13 may be one, two or more.

Fourth Embodiment

Figure 5:
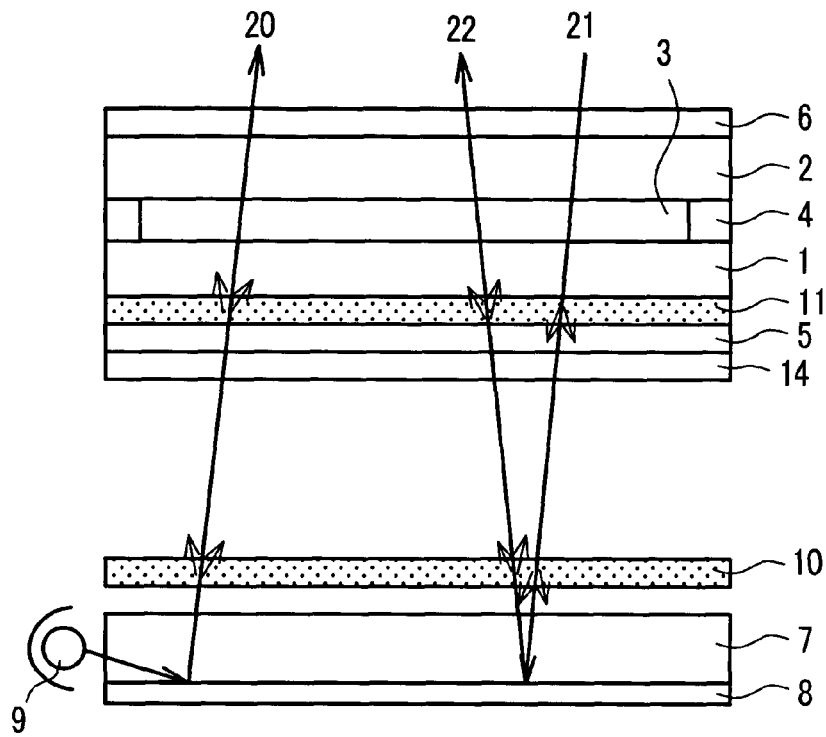
FIG. 5 is a cross-sectional view for explaining the fourth embodiment of the present invention.

FIG. 5 is a cross-sectional view for explaining the fourth embodiment of the present invention.

In this embodiment, the explanation of the points which overlap the corresponding points of other embodiments described above is omitted. In this embodiment, the constitution which makes this embodiment different from the first embodiment shown in FIG. 1 lies in that a reflection polarizer 14 is added at the back face side of the polarizer 5.

Fifth Embodiment

Figure 6:
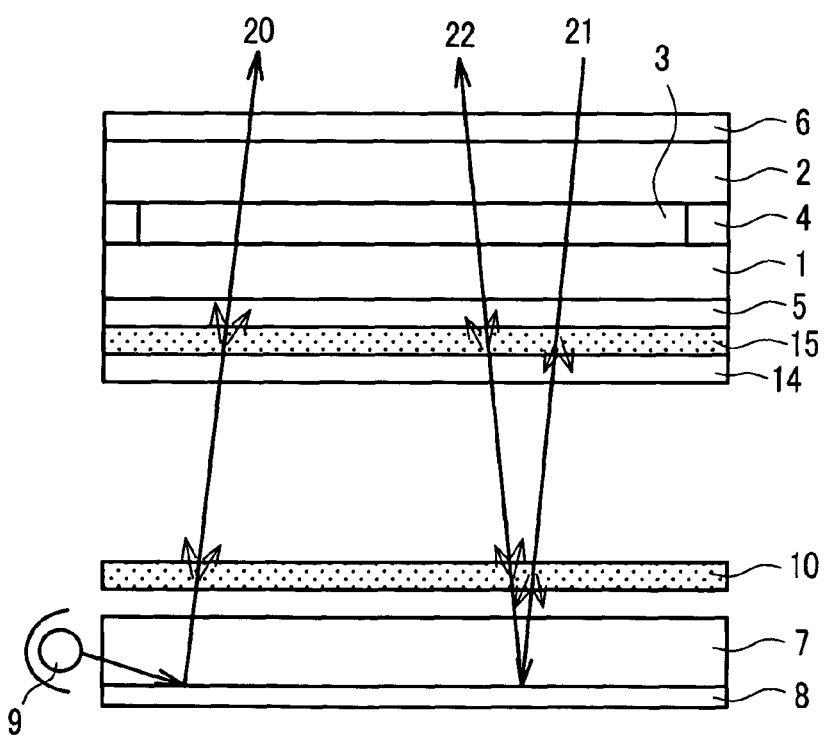
FIG. 6 is a cross-sectional view for explaining the fifth embodiment of the present invention.

FIG. 6 is a cross-sectional view for explaining the fifth embodiment of the present invention.

In this embodiment, the explanation of the points which overlap the corresponding points of other embodiments described above is omitted. In this embodiment, the constitution which makes this embodiment different from the fourth embodiment shown in FIG. 5 lies in the position of the light diffusion layer 15. That is, in place of the light diffusion layer 11 which is arranged between the first substrate 1 and the polarizer 5, the light diffusion layer 15 is arranged between the polarizer 5 and the reflection polarizer 14.

By using, for example, a diffusion tacky adhesive material which functions as a light diffusion layer as the light diffusion layer 15 and by laminating the polarizer 5 and the reflection polarizer 14 to each other, the number of parts can be reduced. This embodiment is not limited to such a constitution and other part which function as a light diffusion layer may be used.

Sixth Embodiment

Figure 7:
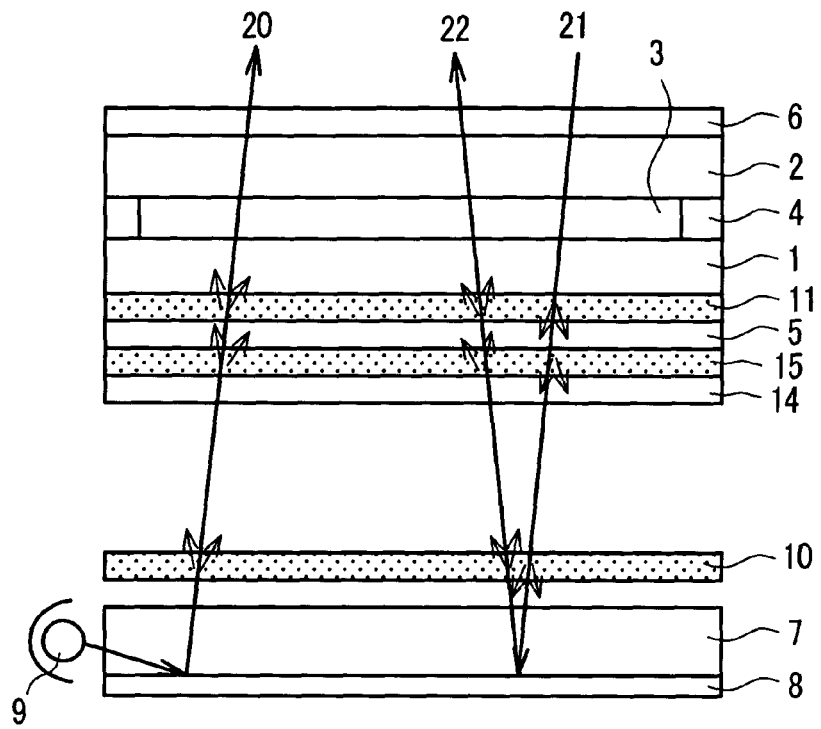
FIG. 7 is a cross-sectional view for explaining the sixth embodiment of the present invention.

FIG. 7 is a cross-sectional view for explaining the sixth embodiment of the present invention.

In this embodiment, the explanation of the points which overlap the corresponding points of other embodiments described above is omitted. In this embodiment, the constitution which makes this embodiment different from the fourth embodiment shown in FIG. 5 lies in that in addition to the light diffusion layer 10 and the light diffusion layer 11 which is arranged between the first substrate 1 and the polarizer 5, a light diffusion layer 15 is also arranged between the polarizer 5 and the reflection polarizer 14.

By using, for example, a diffusion tacky adhesive material which functions as a light diffusion layer as the light diffusing layers 11, 15, the number of parts can be reduced. This embodiment is not limited to such a constitution and other part which functions as a light diffusion layer may be used.

The constitution which makes this embodiment different from other embodiments which have been explained heretofore lies in that the number of light diffusion layers which are arranged between the first substrate 1 and the reflector 8 is three. The number of light diffusion layers is not limited to three and maybe four or more. The larger the number of the light diffusion layers, the diffusion effect can be increased. However, from a viewpoint of loss of light, it is desirable to reduce the number of the light diffusion layers.

Seventh Embodiment

Figure 8:
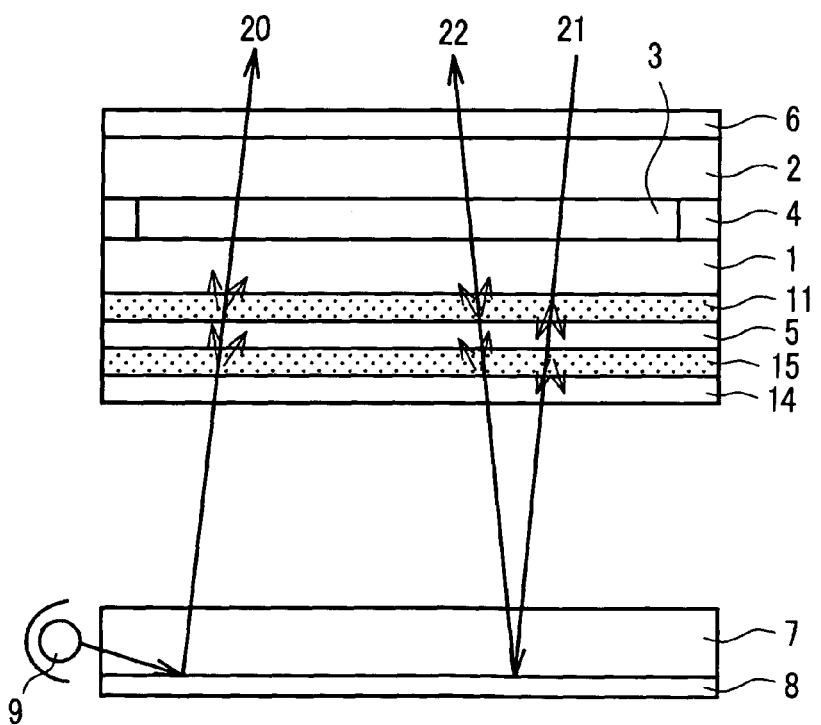
FIG. 8 is a cross-sectional view for explaining the seventh embodiment of the present invention.
Figure 9:
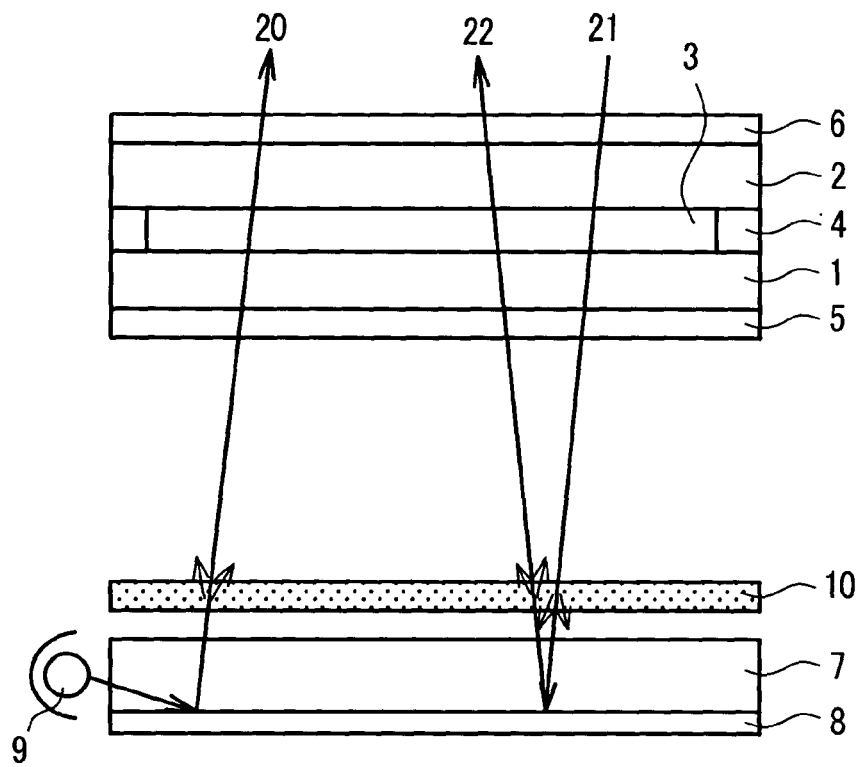
FIG. 9 is a cross-sectional view for explaining an example of a conventional second type liquid crystal display device.

FIG. 8 is a cross-sectional view for explaining the seventh embodiment of the present invention.

In this embodiment, the explanation of the points which overlap the corresponding points of other embodiments described above is omitted. In this embodiment, the constitution which makes this embodiment different from the sixth embodiment shown in FIG. 7 lies in that the light diffusion layer 10 is omitted.

Other Modifications

With respect to the embodiments explained heretofore, two or more embodiments can be combined to each other provided that they do not conflict each other. For example, the prism sheet 13 which is explained in the third embodiment shown in FIG. 4 is applicable to the fourth embodiment shown in FIG. 5.

According to the embodiments and modifications described heretofore, it is possible to obtain the liquid crystal display device which ensure the favorable visibility.

What is claimed is:

1. A liquid crystal display device, comprising:
   a transmissive type liquid crystal display panel which sandwiches a liquid crystal layer between a pair of substrates; and
   a backlight arranged at a back face of the liquid crystal display panel and having a light source and a reflector,
   wherein the liquid crystal display device is configured to simultaneously perform as a transmissive display which transmits a light from the light source therethrough and as a reflective display which reflects an external light incident from a front face side of the liquid crystal display panel by the reflector, a polarizer is arranged between the back-face-side substrate of the pair of substrates and the backlight, the polarizer is formed to absorb polarized light having a predetermined polarization direction, at least two or more light diffusion layers are arranged between the back-face-side substrate of the pair of substrates and the reflector of the backlight to substantially diffuse the external light and minimize a shade from being viewed from an oblique direction, the at least two or more light diffusion layers include a first diffusion layer and a second diffusion layer, and a prism sheet is arranged between the first diffusion layer and the second diffusion layer.

2. A liquid crystal display device according to claim 1, wherein at least one of the light diffusion layers is constituted of a diffusion plate or a diffusion sheet.

3. A liquid crystal display device according to claim 1, wherein at least one of the light diffusion layers is constituted of a diffusion tacky adhesive material.

4. A liquid crystal display device according to claim 1, wherein at least one of the light diffusion layers is constituted of a diffusion film.

5. A liquid crystal display device, comprising:

a transmissive type liquid crystal display panel which sandwiches a liquid crystal layer between a pair of substrates, a light source, a light guide body which is arranged at a back face side of the liquid crystal display panel and on which the light from the light source is incident, and a reflector which is arranged at a back face of the light guide body, wherein the liquid crystal display device is configured to simultaneously perform as a transmissive display which transmits a light from the light source therethrough and as a reflective display which reflects an external light incident from a front face side of the liquid crystal display panel by the reflector, a polarizer is arranged between the back-face-side substrate of the pair of substrates and the light guide body, the polarizer is formed to absorb polarized light having a predetermined polarization direction, at least two or more light diffusion layers are arranged between the back-face-side substrate of the pair of substrates and the light guide body to substantially diffuse the external light and minimize a shade from being viewed from an oblique direction, the at least two or more light diffusion layers include a first diffusion layer and a second diffusion layer, and a prism sheet is arranged between the first diffusion layer and the second diffusion layer.

6. A liquid crystal display device according to claim 5, wherein the liquid crystal display device includes the light diffusion layer being arranged between the back-face-side substrate and the polarizer.

7. A liquid crystal display device according to claim 5, wherein the liquid crystal display device includes a diffusion tacky adhesive material being arranged between the back-face-side substrate and the polarizer as at least one of the light diffusion layers.

8. A liquid crystal display device according to claim 5, wherein the liquid crystal display device includes at least one of the light diffusion layers being arranged on a surface of the polarizer at a side where the light guide body is positioned.

9. A liquid crystal display device according to claim 5, wherein the polarizer is provided with an antiglare layer as the light diffusion layer.

10. A liquid crystal display device according to claim 5, wherein the liquid crystal display device includes a reflection polarizer arranged between the polarizer and the light guide body, and the light diffusion layer being arranged between the polarizer and the reflection polarizer.

11. A liquid crystal display device according to claim 5, wherein the liquid crystal display device includes a reflection polarizer arranged between the polarizer and the light guide body, and a diffusion tacky adhesive material arranged between the polarizer and the reflection polarizer as at least one of the light diffusion layers.

12. A liquid crystal display device according to claim 5, wherein the liquid crystal display device includes a reflection polarizer arranged between the polarizer and the light guide body, at least one of the light diffusion layers being arranged between the back-face-side substrate and the polarizer, and at least one of the light diffusion layers being arranged between the polarizer and the reflection polarizer.

13. A liquid crystal display device according to claim 5, wherein the liquid crystal display device includes a diffusion plate or a diffusion sheet which acts as one of the light diffusion layers and the diffusion plate or the diffusion sheet is arranged at a position closest to the light guide body among the at least two or more light diffusion layers.

* * * * *